United States Patent
Mariani et al.

(10) Patent No.: US 7,396,426 B2
(45) Date of Patent: Jul. 8, 2008

(54) METHOD FOR MAKING A REINFORCING STRUCTURE FOR A VEHICLE TYRE AND A TYRE MADE BY THE METHOD

(75) Inventors: Fiorenzo Mariani, Biassono (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 132 days.

(21) Appl. No.: 10/495,161

(22) PCT Filed: Nov. 22, 2001

(86) PCT No.: PCT/IT01/00584

§ 371 (c)(1),
(2), (4) Date: Oct. 25, 2004

(87) PCT Pub. No.: WO03/045674

PCT Pub. Date: Jun. 5, 2003

(65) Prior Publication Data

US 2005/0061416 A1    Mar. 24, 2005

(51) Int. Cl.
- B29D 30/00 (2006.01)
- B29D 30/06 (2006.01)
- B60C 9/00 (2006.01)

(52) U.S. Cl. .................... 156/110.1; 156/117; 156/123; 152/548; 152/555

(58) Field of Classification Search ................. 152/539, 152/540, 541, 542, 543, 546, 552, 555, 547
See application file for complete search history.

(56) References Cited

U.S. PATENT DOCUMENTS

| | | |
|---|---|---|
| 3,044,522 A | 7/1962 | Drakeford et al. |
| 3,082,140 A | 3/1963 | Vanzo |
| 3,674,079 A | 7/1972 | Varner |
| 3,904,463 A | 9/1975 | Boileau |
| 4,830,781 A | 5/1989 | Oswald |
| 4,981,542 A | 1/1991 | Carrier |
| 5,004,031 A | 4/1991 | Kadota et al. |
| 5,395,475 A | 3/1995 | Ozawa et al. |
| 5,975,175 A | 11/1999 | Armellin |

FOREIGN PATENT DOCUMENTS

DE    1262580    *    3/1968

(Continued)

*Primary Examiner*—Justin Fischer
(74) *Attorney, Agent, or Firm*—Finnegan, Henderson, Farabow, Garrett & Dunner, L.L.P.

(57) ABSTRACT

A method for making a reinforcing structure for a vehicle tire includes laying down at least one continuous thread element onto a support element, generating one or more layers. A path of the at least one thread element is substantially concentric with a rotation axis of the tire. The at least one thread element is laid down according to an undulated trajectory including a plurality of waves succeeding each other along a line circumferentially extended around the rotation axis of the tire. A tire for a vehicle wheel includes a carcass structure, a pair of annular anchoring structures, reinforcing structures disposed at axially opposite side portions of at least one carcass ply of the carcass structure, a belt structure, a pair of sidewalls, and a tread band. Each reinforcing structure includes one or more layers of at least one continuous thread element extending according to the undulated trajectory.

17 Claims, 5 Drawing Sheets

FOREIGN PATENT DOCUMENTS

| | | | |
|---|---|---|---|
| DE | 2 064 753 | | 7/1972 |
| DE | 4234562 | * | 4/1994 |
| EP | 0290328 | * | 11/1988 |
| EP | 0 501 782 | | 9/1992 |
| EP | 0 916 522 A2 | | 5/1999 |
| EP | 0 976 536 A2 | | 2/2000 |
| EP | 1 101 597 A2 | | 5/2001 |
| JP | 2001-71707 | * | 3/2001 |
| WO | WO 00/35666 | | 6/2000 |
| WO | WO 02/096631 A1 | | 12/2002 |

* cited by examiner

METHOD FOR MAKING A REINFORCING STRUCTURE FOR A VEHICLE TYRE AND A TYRE MADE BY THE METHOD

CROSS-REFERENCE TO RELATED APPLICATIONS

This application is a national-phase entry under 35 U.S.C. § 371 from International Application No. PCT/IT01/00584, filed Nov. 22, 2001, in the Italian Patent Office, the content of which is relied upon and incorporated herein by reference.

BACKGROUND OF THE INVENTION

1. Field of the Invention

The present invention relates to a method for making reinforcing structures for vehicle tyres, comprising the step of laying down at least one continuous thread-like element onto a support element, according to a deposition path substantially concentric with the rotation axis of the tyre.

The invention also relates to a tyre integrating reinforcing structures made according to said method, said tyre being of the type comprising a carcass structure including at least one carcass ply having its ends in engagement with respective circumferentially inextensible annular anchoring structures; said carcass ply having two axially-opposite side portions separated from each other by a crown portion and each extending radially away from one of the annular anchoring structures until said crown portion; a belt structure applied to said crown portion at a radially external position relative to the carcass ply; a pair of sidewalls applied to said side portions at an axially external position relative to the surfaces of the carcass ply; a tread band applied to the belt structure at a radially external position thereof; reinforcing structures, each comprising at least one continuous thread-like element extending in an undulated trajectory substantially concentric with the rotation axis of the tyre.

2. Description of the Related Art

Manufacture of tyres for vehicle wheels involves formation of a carcass structure essentially made up of one or more carcass plies shaped in a substantially toroidal configuration and having their axially opposite side edges in engagement with respective annular anchoring structures integrating circumferentially inextensible annular inserts usually referred to as "bead rings" placed at the tyre regions usually identified with the name of "beads".

Applied to the carcass structure, at a radially external position, is a belt structure comprising one or more belt layers in the form of a closed loop, substantially made up of textile or metallic cords suitably oriented with respect to each other and to the cords belonging to the adjacent carcass plies.

At a radially external position to the belt structure a tread band is applied usually comprising a strip of elastomeric material of appropriate thickness.

It should be pointed out that, to the aims of the present description, by the term "elastomeric material" it is intended blends of rubber in their entirety, i.e. assemblies formed of at least one base polymer suitably amalgamated with reinforcing fillers and process additives of various types.

Finally, to the opposite sides of the tyre being processed, a pair of sidewalls is applied each of which covers a side portion of the tyre included between a so-called shoulder region, located close to the respective side edge of the tread band, and a so-called bead located at the corresponding bead-ring.

Tyres are generally classified into at least two categories, differentiated from each other due to the orientation exhibited by the cords being part of the carcass plies. In particular, there are the so-called "radial tyres" in which each of the cords arranged in the carcass ply or plies lies in a plane substantially radial to the rotation axis of the tyre, i.e. has an orientation substantially orthogonal to the circumferential extension direction. Then there are the so-called tyres "of the conventional type" or "cross-ply tyres", the carcass structure of which generally comprises at least one carcass ply having cords oriented obliquely to the circumferential extension direction of the tyre, and a second carcass ply, radially superposed on said first ply, the cords of which exhibit a symmetrically-crossed oblique orientation with respect to the cords of the first ply.

Tyres of the radial type, as compared with those of the conventional type, offer advantages in terms of lightness, ride comfort, resistance to wear and structural strength to high speeds. Conversely, they have a sidewall of weaker structure than tyres of the conventional type, so that a possible failure at the sidewall usually involves the tyre being out of use.

The above features have caused the tyres of the conventional type to be basically fallen into disuse in those Countries where a modern road network (minimising the risk of accidental failures to the sidewall) is present, in favour of tyres of the radial type.

Development in time of these tyres has led to a progressive reduction in their section height also for the purpose of obviating the feeling of ride unsteadiness generated by the sidewalls that are radially very extended.

In particular cases and/or for specific uses requiring that the tyre sidewalls should have a higher strength than that offered by the carcass ply, also in combination with a reduced section height, the sidewalls of a tyre is to be strengthened by means of additional reinforcing elements.

In particular, from document U.S. Pat. No. 3,044,522 reinforcement for tyres is known which is assembled on a collapsible drum and subsequently applied to the tyre carcass. The reinforcement is made up of layers axially disposed in a side-by-side relationship upon interposition of an elastomeric filling element. Each layer is defined by a plurality of coils disposed radially in side-by-side relationship and extending in a sinuous course having predetermined pitch and width. In addition, the coils of two distinct layers are circumferentially offset relative to each other, by about half a pitch.

Document U.S. Pat. No. 3,044,522 in the same manner as many other traditional production methods, essentially involves that the individual tyre components should be first made separately from each other to be then assembled during a tyre-building step.

The Applicant's present trend is however that of resorting to manufacture methodologies enabling production and storage of semi-finished articles to be minimised or, if possible, eliminated.

Practically, the research and development studies carried out by the Applicant are oriented to new process solutions allowing the individual components to be made by directly forming them on the tyre being built, preferably following a pre-established sequence.

This is particularly suitable above all in the production of tyres of the radial type.

In this connection, production processes have been proposed which aim at obtaining given tyre components, such, for example, as tread band, sidewalls or others, by laying down onto a toroidal support carrying the tyre being worked, a continuous strip-like element of elastomeric material having a reduced section as compared with that of the component to be obtained and disposed to form a plurality of coils around the rotation axis of the tyre, which coils are arranged consecutively in side by side relationship and/or superposed on each other so as to define the component itself in its final configuration.

In the European Patent Application No. 01830350.3 the Applicant has proposed adoption of annular stiffening inserts placed at the sidewalls of the radial tyres to increase stiffness of same, obtained by circumferentially winding at least one continuous thread-like element into several consecutive turns so as to form a series of coils disposed in radial side by side relationship and concentric with the geometric rotation axis of the tyre.

The Applicant has perceived that, notwithstanding the good results achieved with these inserts formed of one or more spiral-wound thread-like elements, there is still an interest in trying to improve tyre performance, in particular as regards increase in the sidewall stiffness of tyres intended for equipping two-wheeled vehicles. In fact, during the ride on a bend these tyres bank with respect to the vertical, according to camber angles of a very high value, thereby submitting the tyre sidewalls to important stresses.

These tyres have a marked transverse curvature at the crown which is normally defined by the particular value of the ratio between the distance of the tread centre from the line passing through the laterally opposite extremities of the tread itself, measured at the equatorial plane of the tyre, and the distance measured along the tyre chord between said extremities. In tyres for two-wheeled vehicles the value of the curvature ratio is generally at least about 0.15 and usually it is of about 0.3 in the case of rear tyres and also higher, until about 0.45, in the case of front tyres, versus a value usually of about 0.05 in motor-vehicle tyres.

SUMMARY OF THE INVENTION

The Applicant has perceived that, in accordance with the present invention, it is possible to increase the sidewall stiffness in radial tyres, while keeping the advantages typical of a tyre of a radial structure in terms of lightness, ride comfort and structural strength. This is achievable by laying down a continuous thread-like element on the tyre sidewalls according to an undulated trajectory substantially concentric with the rotation axis of the tyre.

Therefore, it is an object of the present invention to provide a method for making reinforcing structures for vehicle tyres, comprising the step of laying down at least one continuous thread-like element onto a support element, according to a path substantially concentric with the rotation axis of the tyre, characterised by the fact of generating at least one layer of said at least one continuous thread-like element by laying down said continuous thread-like element according to an undulated trajectory including a plurality of waves succeeding each other along a line circumferentially extended around the rotation axis of said tyre.

It is a further object of the invention to provide a tyre for vehicle wheels, characterised by reinforcing structures placed at the sidewalls of said tyre, each including at least one layer of at least one continuous thread-like element extending according to an undulated trajectory including a plurality of waves succeeding each other along a line circumferentially extended around the rotation axis of said tyre.

In an embodiment of the present invention said at least one continuous thread-like element is laid down in several layers, so that the waves of the different layers mutually cross to create a network structure.

The tyre of the present invention can be suitable for either two-wheeled or four-wheeled vehicles, the latter including both cars and the so-called industrial vehicles.

In the present specification and in the claims, the term "support element" means the tyre structure upon which the reinforcing structure being the object of the present invention is laid down, as better clarified in the following.

In the present specification and in the claims, the terms "undulated" and "wave" refer both to substantially sinusoidal shapes (with continuous bending) and to the so-called zigzag shapes, characterised by broken lines.

BRIEF DESCRIPTION OF THE DRAWINGS

Further features and advantages will become more apparent from the detailed description of a preferred but not exclusive embodiment of a method for making reinforcing structures for vehicle tyres, and a tyre incorporating reinforcing structures made in accordance with the present invention. This description will be set out hereinafter with reference to the accompanying drawings, given by way of non-limiting example, in which.

DETAILED DESCRIPTION OF THE EXEMPLARY EMBODIMENTS

With reference to the drawings, a tyre having a reinforcing structure obtainable by the method in accordance with the present invention has been generally identified by reference numeral 1.

Figure 2:
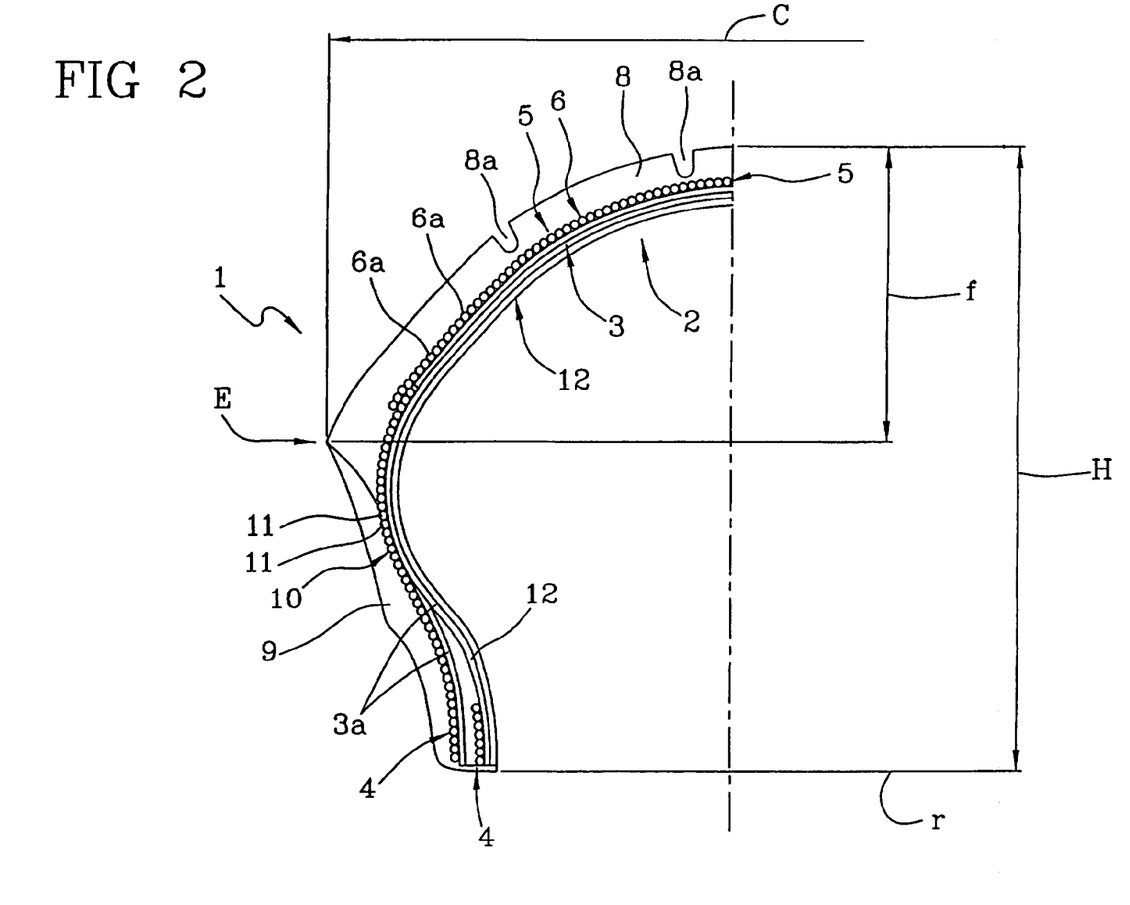
FIG. 2 is an interrupted section taken in a plane radial to the rotation axis of a tyre for two-wheeled vehicles, showing the cross-section outline of the tyre components.

In the embodiment shown in FIG. 2 concerning a tyre for motor-vehicles, tyre 1 has a right section marked by a high transverse curvature: in more detail, said tyre 1 has a section height H measured in the equatorial plane between the centre of the tread band and the fitting diameter identified by the reference line r and passing through the tyre beads.

In addition, tyre 1 has a width C defined by the distance between the laterally opposite ends E of the tread itself, and a curvature defined by the particular value of the ratio between the distance f of the tread centre from the line passing through the extremities E of the tread itself, measured in the equatorial plane of the tyre.

The invention takes a particular importance when applied to tyres for two-wheeled vehicles having a section ratio H/C as high as or lower than 0.70 and generally also marked by a curvature ratio f/C higher than 0.15, although its extent and advantages also apply to tyres of other types, those for four-wheeled vehicles for example, whether they are cars or the so-called industrial vehicles.

Figure 1:
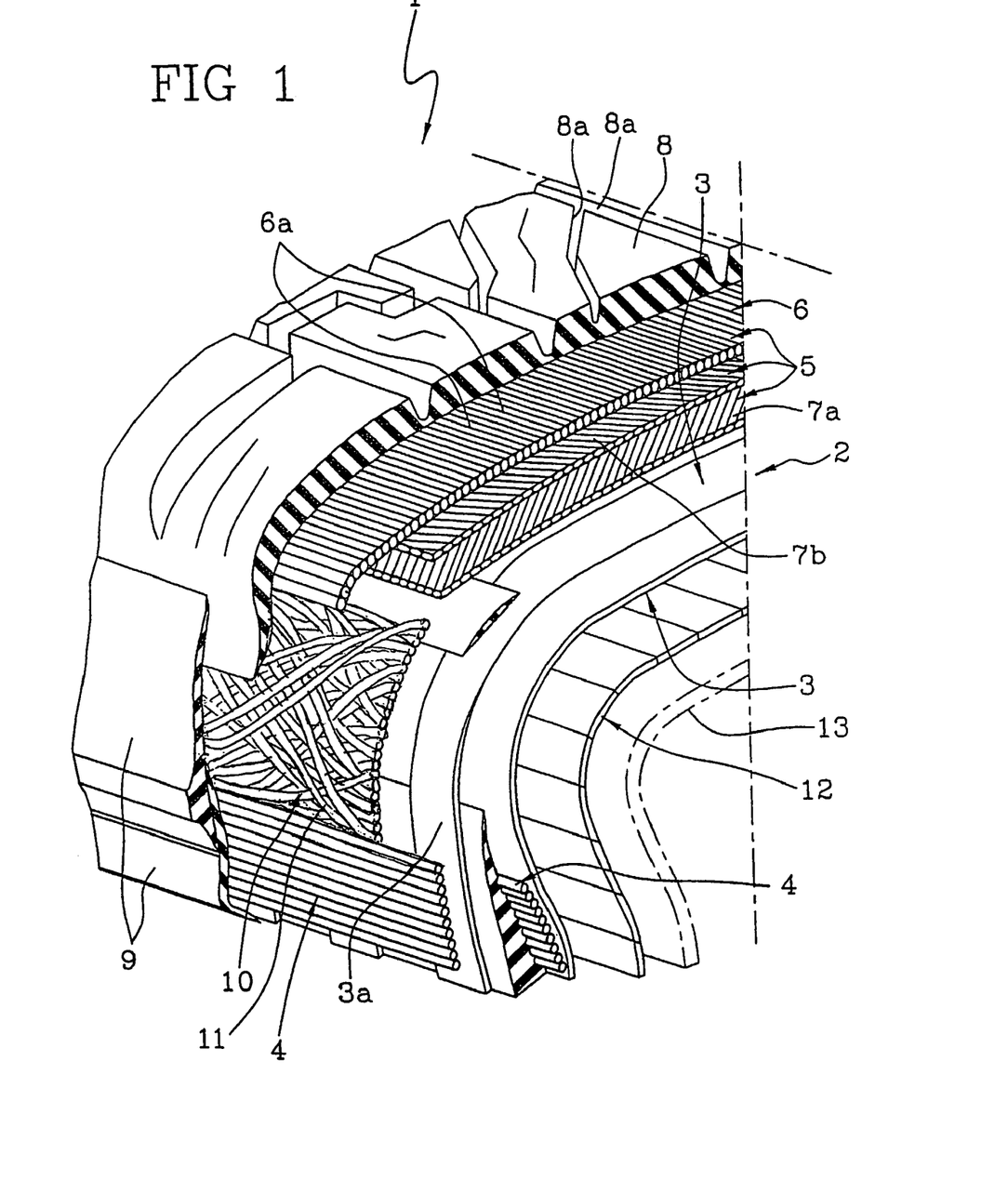
FIG. 1 is a fragmentary perspective and split view of a tyre for four-wheeled vehicles provided with a reinforcing structure accomplished in accordance with the present invention.

With reference to FIGS. 1 and 2, tyre 1 comprises a carcass structure 2 having at least one carcass ply 3 of a substantially toroidal conformation and engaged, by its axially spaced apart circumferential edges, with a pair of annular anchoring structures 4 each of which, when tyre 1 is finished, is disposed in the region usually denoted as "bead".

The carcass ply 3 has two side portions 3a each extending radially away from one of the annular anchoring structures 4.

Applied to the carcass structure 2, at a circumferentially external position, is a belt structure 5 comprising at least one primary belt layer 6, including one or more continuous parallel cords or other appropriate thread-like elements, wound into coils 6a disposed in axial side-by-side relationship and having a constant or varying density (the latter case being not shown), and oriented at a substantially zero angle with respect to an equatorial plane of the tyre, as described in Patent U.S. Pat. No. 5,975,175 in the name of the Applicant, for example. Possible auxiliary belt layers 7a, 7b (diagrammatically shown in chain line in FIG. 1) can be disposed at a radially internal position relative to the primary belt layer 6. Circumferentially superposed on the belt structure 5 is a tread band 8 on which, following a moulding operation carried out concurrently with vulcanisation of the tyre, longitudinal and/or transverse grooves 8a disposed to define a desired "tread pattern" can be formed.

Tyre 1 also comprises a pair of so-called "sidewalls" 9 laterally applied, on opposite sides, to reinforcing structures 10 as hereinafter defined, at an axially external position relative to the side portions 3a of the carcass ply 3.

Each of said reinforcing structures 10 comprises at least one layer of a continuous thread-like element 11 extending in an undulated trajectory 11a around the rotation axis X of tyre 1, and is axially interposed between a respective side portion 3a of the carcass ply 3 and one of the sidewalls 9. Preferably, each structure 10 extends between one of the annular anchoring structures 4 and a corresponding side edge of the belt structure 5. In more detail, the side edge of the belt structure 5 is preferably in overlapping relationship, by a desired extent, with the radially external end edge of the reinforcing structure 10, as exemplified in FIGS. 1 and 2.

The carcass structure 2 can be possibly coated, on its inner surface, with a so-called "liner" 12, essentially made of at least one air-tight layer of elastomeric material for ensuring a hermetic seal of tyre 1 when inflated.

The present invention can be advantageously put into practice by a method according to which, except for what described in more detail in the following of the present specification, assembling of the above listed components, as well as production of one or more of same, is preferably achieved following the teachings proposed in document EP-A-0976536, in the name of the same Applicant, for example.

Within the manufacturing process of tyre 1, formation of the carcass ply 3 can be advantageously carried out by sequentially laying down previously cut strip-like elements, consecutively disposed in mutual circumferential side-by-side relationship on the outer surface of a toroidal support 13 on which liner 12 may have been previously formed.

Accomplishment of tyre 1 involves execution of further working steps, such as application of the belt structure 5 at a position radially external to the carcass structure 3, application of the tread band 8 at a position radially external to the belt structure 5 and application of sidewalls 9 on opposite sides of the carcass structure 3, not further described as not of importance to the aims of the invention.

The reinforcing structures 10 are laid down before application of the sidewalls and, preferably, also before application of the belt.

Figure 7:
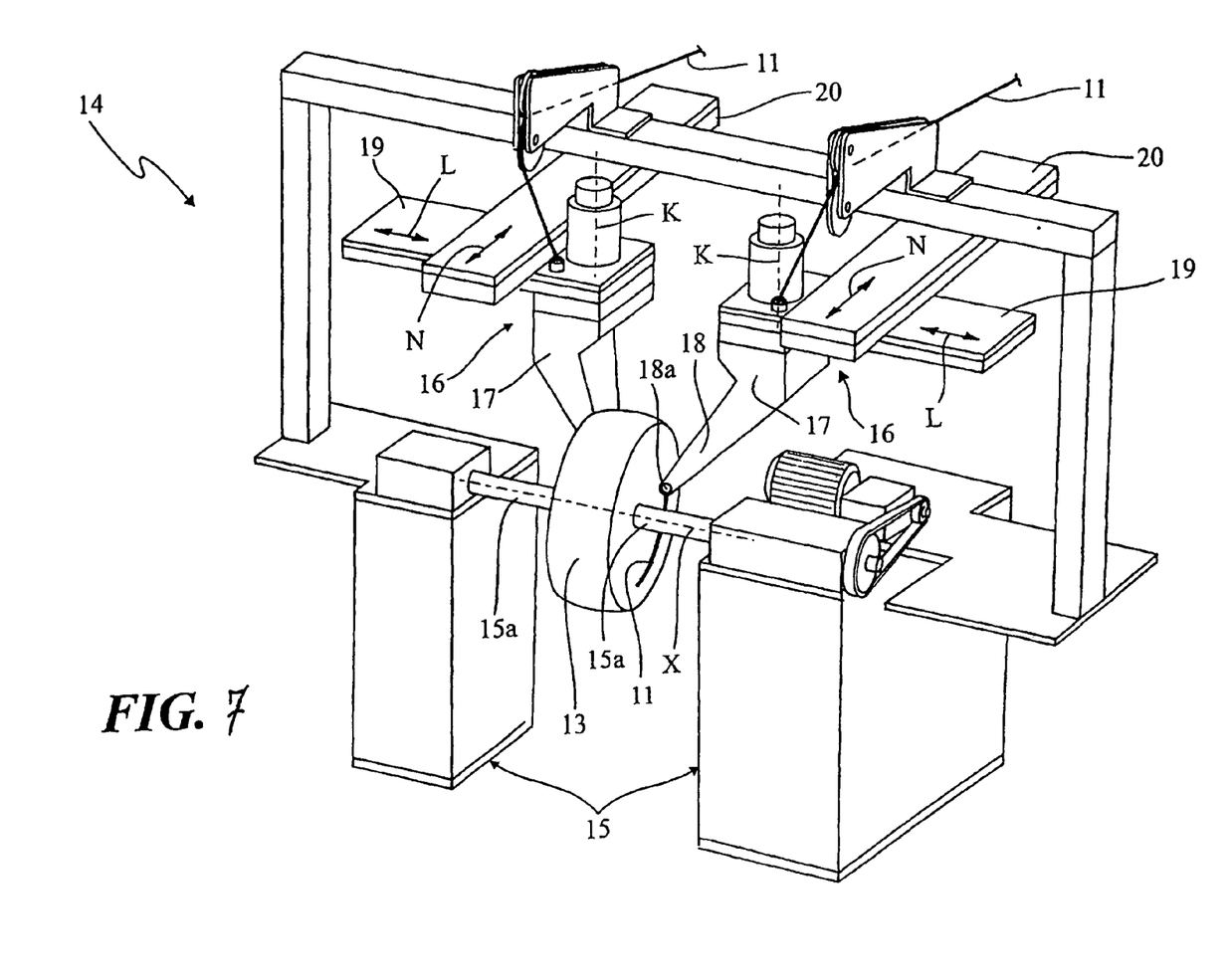
FIGS. 7 and 8 show two different apparatus adapted to make reinforcing structures for vehicle tyres in accordance with the present invention.

Within this manufacturing process, an apparatus to be used for making the reinforcing structures 10 of tyre 1 has been denoted by 14 in FIG. 7.

To this aim, apparatus 14 essentially comprises a support device 15 arranged to engage the toroidal support 13 at an attachment shank 15a coaxially jutting out from at least one side of said support 13. Associated with the support device 15 are appropriate devices to drive the toroidal support 13 in rotation around its geometric axis that, when the tyre has been completed, is coincident with the rotation axis X of the latter. A pair of deposition members 16 operates on the opposite sides of the toroidal support 13 each for the purpose of carrying out application of the continuous thread-like element coming, for example, from a supply reel or directly from an extruder or other suitable supply devices, not shown because they are not of importance to the aims of the invention. The continuous thread-like element 11, preferably rubberised with a thin layer of elastomeric material, can be made of textile or metallic material. Preferably it is of textile material, more preferably selected from the group consisting of nylon and poly(ethylene-naphthalene-2,6-di-carboxylate), also known as PEN.

Each deposition member 16 essentially comprises an arm 17 carrying an end roller or another type of applying device 18 oriented in an axis radial to the rotation axis X of the toroidal support 13 and arranged to act in thrust relationship against the toroidal support 13 itself to apply the thread-like element 11 and make it adhere to the end flap of the carcass ply 3 or other support element, at a given application point 18a.

The arm 17 of each deposition member 16 is carried by a first guide structure 19 movable in a first movement direction "L", preferably parallel to the rotation axis X of the toroidal support 13. The first guide structure 19 is in turn movable on a second guide structure 20, along a second direction "N" preferably orthogonal to the first movement direction "L". These movements result in corresponding movements of the applying end roller 18 and consequent displacements of the application point 18a of the thread-like element 11 on the toroidal support 13.

Each arm 17 is also preferably rotatable about an oscillation axis "K" orthogonal to the movement directions "L" and "N".

In order to make each of the reinforcing structures 10, it is essentially provided that the applying end roller 18 of each deposition member 16 should be brought into thrust relationship against the outer surface of the toroidal support 13 to cause application of a first end of the continuous thread-like element 11 against the respective end flap of the carcass ply 3 or other component of tyre 1 previously formed on the toroidal support itself 13.

Preferably, deposition of the continuous thread-like element 11 is preceded by deposition onto the carcass ply 3 of a skim coat of suitable elastomeric material. As an alternative to deposition of said skim coat, the strip-like elements constituting the carcass ply 3 are provided with an asymmetric rubberising layer richer in elastomeric material at the outer surface thereof.

Simultaneously with or immediately after application of the first end of the continuous thread-like element 11, the toroidal support 13 is driven in rotation around its geometric axis X. Concurrently with this rotatory motion, the applying end roller 18 of each deposition member 16, and therefore the application point 18a of the respective thread-like element 11, is moved close to or away from the rotation axis X in the movement direction N, whereas movements along the oscillation axis "K" and the movement axis "L" ensure a constant thrust relationship of the continuous thread-like element 11 against the toroidal support 13.

The applying end roller 18 carries out such a displacement that at least one layer of the continuous thread-like element is laid down on support 13 in an undulated trajectory 11a substantially concentric with the rotation axis X. The undulated trajectory 11a develops into a plurality of waves 11b consecutively disposed along a line "t" circumferentially extended around the rotation axis of said tyre. Should the continuous thread-like element 11 be laid down in several layers, the waves 11b of one layer would cross those of another, as detailed in the following.

Figure 8:
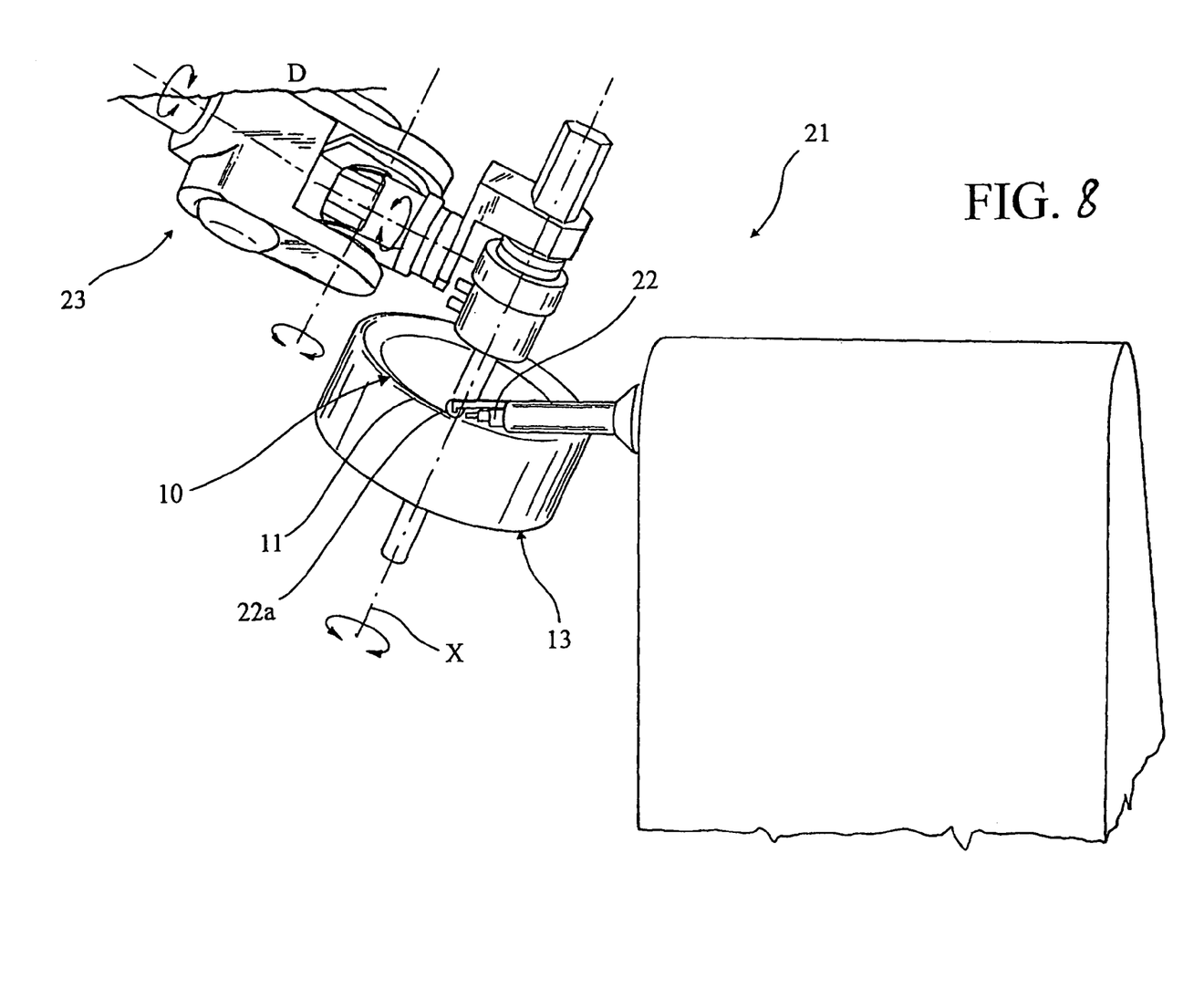

Alternatively, the transverse distribution movement having at least one component perpendicular to axis X is achieved through movement of axis X of the toroidal support 13 by use of a second type of apparatus, partly illustrated in FIG. 8 and identified by numeral 21.

In this case, the devices for application of the thread-like element 11 can advantageously be fixed devices 22; consequently the application point is a fixed-point 22a too.

For the purpose it is provided that the circumferential distribution means, designed to drive the toroidal support 13 in rotation around its own axis X, and the transverse-movement means should be integrated into a robotized arm 23, partly shown in FIG. 8, arranged to removably engage the toroidal support 13, preferably in cantilevered fashion, to conveniently move it with respect to the applying devices 22.

Preferably, the robotized arm 23 is a seven-axis anthropomorphous arm, of the type described in WO 00/35666 (in the name of the same Applicant), for example.

During deposition of the reinforcing structure 10, the robotized arm 23 carries out suitable orientation of the toroidal support 13 relative to the application point 22a, and drives the support in rotation around the rotation axis X in synchronism with said orientation movements, so as to determine distribution of the thread-like element 11 in at least one layer, following an undulated trajectory 11a.

In particular, concurrently with rotation around axis X, the toroidal support 13 is moved along directions having at least one component orthogonal to the axis X itself.

Irrespective of how they are obtained, the undulated trajectories 11a have an extension determined by the laws of relative motion between the applying devices 18 or 22 and the toroidal support 13.

More specifically, the thread-like element 11 extends in an alternated undulated trajectory 11a to form waves 11b having a pitch "p" and a width "a", disposed consecutively along a line "t", as shown in FIGS. 3 to 6.

Width "a" and pitch "p", can be constant or variable in an independent manner both in each layer and, in case, in the different deposition layers of the continuous thread-like element 11.

Line "t", of a predetermined diametrical size "d", describes a path in a plane normal to the rotation axis of tyre 1, along which the undulated deposition trajectory 11a of the thread-like element 11 extends, around the rotation axis X of the tyre itself. When the thread-like element 11 is provided in more than one layer, the layers can be laid down in an undulated trajectory 11a and line "t" may be of a varying or constant diametrical size "d".

If the continuous thread-like element 11 is laid down in several layers, and pitch "p" does not correspond to an exact sub-multiple of the circumferential extension of line "t", the waves 11b of each layer will be offset relative to those of other layers, so that a plurality of crossing points will be formed, at which the thread-like element 11 is superposed upon itself to create a network structure on the side portion 3a of tyre 1.

Figures 3, 4, 5, 6:
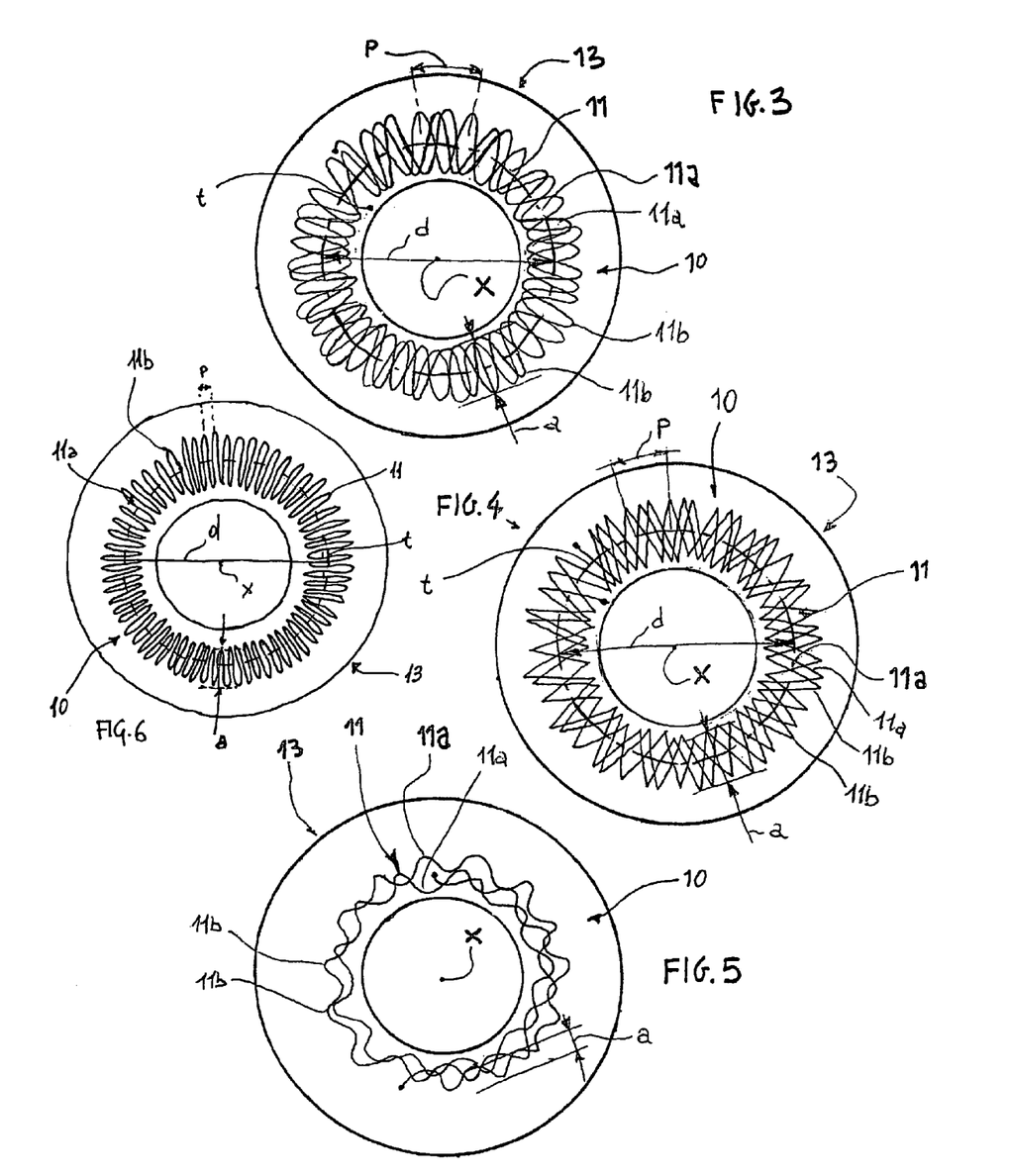
FIGS. 3 to 6 diagrammatically show a continuous thread-like element spiral wound up in an undulated trajectory substantially concentric with the rotation axis of the tyre according to four different embodiments of the concerned method.

By way of example, as shown in FIGS. 3 and 4, in all the deposition layers the thread-like element 11 may be provided to follow trajectories 11a having a substantially circular single line "t", concentric with axis X of tyre 1.

More specifically as regards FIG. 3, each layer has an undulated trajectory 11a of sinusoidal course, with waves 11b that are circumferentially offset with respect to those of other layers by a value different from, and in this case lower than, their distribution pitch "p". In this way the waves 11b of each layer are circumferentially shifted relative to the waves 11b of other layers to create a series of crossing points and, therefore, the above mentioned network structure.

According to this first embodiment, the width "a" of the sinusoid is constant in all the deposition layers and is coincident with the radial extension of the reinforcing structure 10.

In a second embodiment shown in FIG. 4, the undulated trajectory 11a is provided in segments of a broken line substantially disposed at an acute angle with respect to each other, to give origin to a zigzag trajectory.

In this second embodiment too the undulated trajectory 11a keeps on a line "t" of constant diametrical sizes "d" for each layer, and the radial extension of the annular reinforcing structure 10 is determined by width "a" that too is constant for all layers.

In a third embodiment shown in FIG. 5, line "t" (not specifically shown) is a spiral, i.e. it has a varying, in this case growing, diametrical size "d". Also the width "a" of the waves 11b is variable and, still in this case, is smaller than the radial extension of the reinforcing structure 10. Herein, the radial extension of the reinforcing structure 10 is given by the diametrical size "d" of the radially innermost and radially outermost line "t", and also by width "a" of the radially innermost and radially outermost layers.

FIG. 6 shows an example of a thread-like element 11 laid down in a single layer. In this case, the undulated trajectory 11a is formed of a plurality of sinusoidal waves 11b, of a constant width "a" corresponding to the radial extension of the reinforcing structure 10, and a pitch "p" which is also constant and corresponds to one fifth of the pitch shown in FIG. 3.

The present invention achieves important advantages.

A deposition carried out in accordance with the method in reference enables a greater stiffness of the tyre sidewalls to be achieved.

In addition, a deposition carried out in accordance with the method in reference provides further variables, such as pitch "p", width "a", the wave shape and the trajectory of line "t", for managing the radial extension of the reinforcing structure and the circumferential density of the thread-like element and, consequently, the stiffness of said sidewalls.

In particular, the method of the present invention allows stiffening side structures to be made for radial tyres which have a high section ratio, in particular tyres for motorcycles of the "custom" type, for example.

It should be also recognised that the invention, while described with particular reference to accomplishment of reinforcing structures for sidewalls, lends itself to be put into practice in order to make other types of reinforcing structures as well, to be integrated into the structure of a tyre.

Finally, it is to be noted that accomplishment of these reinforcing structures can be also obtained separately of the tyre being processed, on a toroidal support or a support of other type, for a subsequent application to said tyre.

The invention claimed is:

1. A method for making a reinforcing structure for a vehicle tyre, comprising:
    laying down at least one continuous thread element onto a support element;
    wherein laying down the at least one thread element generates several layers of the at least one thread element,
    wherein a path of the at least one thread element is substantially concentric with a rotation axis of the tyre,
    wherein the at least one thread element is laid down according to an undulated trajectory, wherein the undulated trajectory comprises a plurality of waves succeeding each other along a first line circumferentially extended around the rotation axis of the tyre, wherein each layer is generated by laying down the thread element according to the undulated trajectory circumferentially developed along the first line common to all of the several layers; and wherein the method further comprises developing the trajectory according to a second line of a different circumferential extension in at least two of the several layers.

2. The method of claim 1, wherein the support element comprises at least one carcass ply.

3. The method of claim 2, further comprising coating the at least one carcass ply with a skim coat.

4. The method of claim 2, wherein the at least one carcass ply comprises strip elements, and wherein the method further comprises rubberizing the strip elements to a greater extent at a radially external surface of the strip elements.

5. The method of claim 1, wherein the undulated trajectory comprises a plurality of substantially sinusoidal waves.

6. The method of claim 1, wherein the undulated trajectory comprises a plurality of waves in a zigzag shape.

7. The method of claim 1, wherein the first line is a substantially circular line.

8. The method of claim 1, further comprising developing the trajectory according to waves of constant pitch.

9. The method of claim 1, further comprising developing the trajectory according to waves of constant width.

10. A method for making a reinforcing structure for a vehicle tyre, comprising:

laying down at least one continuous thread element onto a support element;

wherein laying down the at least one thread element generates several layers of the at least one thread element, wherein a path of the at least one thread element is substantially concentric with a rotation axis of the tyre, wherein the at least one thread element is laid down according to an undulated trajectory, wherein the undulated trajectory comprises a plurality of waves succeeding each other along a first line circumferentially extended around the rotation axis of the tyre, wherein each layer is generated by laying down the thread element according to the undulated trajectory circumferentially developed along the first line common to all of the several layers, and wherein the method is carried out on a toroidal support by alternately shifting an application point of the at least one thread element along a movement direction radial to a rotation axis of the toroidal support, while the toroidal support is driven in rotation around the rotation axis of the toroidal support.

11. A tyre for a vehicle wheel, comprising:

a carcass structure;

a pair of circumferentially inextensible annular anchoring structures;

reinforcing structures disposed at axially opposite side portions of at least one carcass ply of the carcass structure at axially external positions relative to the at least one carcass ply;

a belt structure applied to a crown portion of the at least one carcass ply at a radially external position relative to the at least one carcass ply;

a pair of sidewalls applied to the reinforcing structures at axially external positions relative to respective reinforcing structures; and a tread band applied to the belt structure at a radially external position of the belt structure;

wherein ends of the carcass structure are engaged with respective annular anchoring structures, wherein the side portions of the at least one carcass ply are separated from each other by the crown portion of the at least one carcass ply, wherein each side portion extends radially away from one of the annular anchoring structures toward the crown portion, wherein each reinforcing structure comprises several layers of at least one continuous thread element extending according to an undulated trajectory, wherein the at least one thread element in each layer is distributed according to the undulated trajectory circumferentially developed along a line common to all of the several layers, and wherein the undulated trajectory comprises a plurality of waves succeeding each other along the line circumferentially extended around a rotation axis of the tyre.

12. The tyre of claim 11, wherein the undulated trajectory comprises a plurality of substantially sinusoidal waves.

13. The tyre of claim 11, wherein the undulated trajectory comprises a plurality of waves succeeding each other in a zigzag shape.

14. The tyre of claim 11, wherein the line is of substantially circular shape.

15. The tyre of claim 11, wherein a pitch of the waves is constant along the line.

16. The tyre of claim 11, wherein a width of the waves is constant along the line.

17. A tyre for a vehicle wheel, comprising:

a carcass structure;

a pair of circumferentially inextensible annular anchoring structures;

reinforcing structures disposed at axially opposite side portions of at least one carcass ply of the carcass structure at axially external positions relative to the at least one carcass ply;

a belt structure applied to a crown portion of the at least one carcass ply at a radially external position relative to the at least one carcass ply;

a pair of sidewalls applied to the reinforcing structures at axially external positions relative to respective reinforcing structures; and a tread band applied to the belt structure at a radially external position of the belt structure;

wherein ends of the carcass structure are engaged with respective annular anchoring structures, wherein the side portions of the at least one carcass ply are separated from each other by the crown portion of the at least one carcass ply, wherein each side portion extends radially away from one of the annular anchoring structures toward the crown portion, wherein each reinforcing structure comprises two or more layers of at least one continuous thread element extending according to an undulated trajectory, wherein the undulated trajectory comprises a plurality of waves succeeding each other along a first line circumferentially extended around a rotation axis of the lyre, and wherein the undulated trajectory comprises a plurality of waves succeeding each other along a second line circumferentially extended around a rotation axis of the tyre in at least two of the layers.

* * * * *

UNITED STATES PATENT AND TRADEMARK OFFICE
CERTIFICATE OF CORRECTION

PATENT NO. : 7,396,426 B2  Page 1 of 1
APPLICATION NO. : 10/495161
DATED : July 8, 2008
INVENTOR(S) : Mariani et al.

It is certified that error appears in the above-identified patent and that said Letters Patent is hereby corrected as shown below:

Claim 17, column 10, line 59, "lyre" should read --tyre,--.

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,396,426 B2  Page 1 of 1
APPLICATION NO. : 10/495161
DATED : July 8, 2008
INVENTOR(S) : Mariani et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 132 days Delete the phrase "by 132 days" and insert -- by 387 days --

Signed and Sealed this

Twenty-ninth Day of June, 2010

David J. Kappos
*Director of the United States Patent and Trademark Office*